(12) United States Patent
Gonzalez et al.

(10) Patent No.: US 6,332,141 B2
(45) Date of Patent: Dec. 18, 2001

(54) APPARATUS AND METHOD OF IMPLEMENTING FAST INTERNET REAL-TIME SEARCH TECHNOLOGY (FIRST)

(75) Inventors: Carlos M. Gonzalez, Menlo Park; James J. Cerna, Jr., Redwood Shores, both of CA (US)

(73) Assignee: NetCurrents, Inc., Beverly Hills, CA (US)

( * ) Notice: Subject to any disclaimer, the term of this patent is extended or adjusted under 35 U.S.C. 154(b) by 0 days.

(21) Appl. No.: 09/875,953

(22) Filed: Jun. 8, 2001

Related U.S. Application Data

(62) Division of application No. 09/726,537, filed on Dec. 1, 2000, which is a division of application No. 09/409,256, filed on Sep. 30, 1999, now Pat. No. 6,260,041.

(51) Int. Cl.[7] .............................. G06F 7/00; G06F 17/30
(52) U.S. Cl. .................................... 707/10; 707/6; 707/9; 707/102; 707/201; 709/217; 709/218; 709/219; 709/203
(58) Field of Search .................................. 707/1, 2, 3, 5, 707/10, 104.1, 531; 709/223, 224, 225, 226, 217, 218, 219

(56) References Cited

U.S. PATENT DOCUMENTS

| | | |
|---|---|---|
| 4,740,909 | 4/1988 | Conklin et al. . |
| 5,696,965 | 12/1997 | Dedrick . |
| 5,706,210 * | 1/1998 | Kumano et al. ................. 364/514 C |
| 5,715,453 | 2/1998 | Stewart . |
| 5,761,662 | 6/1998 | Dasan . |
| 5,813,007 | 9/1998 | Nielsen . |
| 5,862,054 * | 1/1999 | Li .................................... 364/468.28 |
| 5,890,164 | 3/1999 | Neilsen . |
| 5,898,836 | 4/1999 | Freivald et al. . |
| 5,933,604 | 8/1999 | Inakoshi . |
| 5,933,827 | 8/1999 | Cole et al. . |
| 5,937,162 * | 8/1999 | Funk et al. ...................... 395/200.36 |
| 5,956,486 | 9/1999 | Hickman et al. . |
| 5,978,807 | 11/1999 | Mano et al. . |
| 5,978,828 | 11/1999 | Greer et al. . |
| 5,978,833 | 11/1999 | Pashley et al. . |
| 5,978,842 | 11/1999 | Noble et al. . |
| 6,026,440 | 2/2000 | Shrader et al. . |
| 6,035,332 | 3/2000 | Ingrassia, Jr. et al. . |
| 6,041,360 | 3/2000 | Himmel et al. . |
| 6,049,799 | 4/2000 | Mangat et al. . |
| 6,052,730 | 4/2000 | Felciano et al. . |
| 6,055,570 | 4/2000 | Nielsen . |
| 6,065,044 | 5/2000 | Ogasawara . |
| 6,092,102 | 7/2000 | Wagner . |
| 6,182,063 * | 1/2001 | Woods ..................................... 707/3 |
| 6,226,655 | 5/2001 | Berman et al. . |

OTHER PUBLICATIONS

Competitive Intelligence, Software Robots and the Internet: The NewsAlert Prototype, IEEE Cat. No. 1060–3425, 1995.

* cited by examiner

Primary Examiner—Thomas Black
Assistant Examiner—Jacques Veillard
(74) Attorney, Agent, or Firm—Dickstein Shapiro Morin & Oshinsky LLP

(57) ABSTRACT

An apparatus for and method of monitoring and retrieving identifiable statements and other information pertinent to one or more desired search terms or concepts. In a preferred embodiment, a fast Internet real-time search technology (FIRST) system provides a user interface for inputting and editing a list of desired search terms, and a list of resource locations to be monitored. A server causes the periodic access of each resource location listed to determine whether any information on a particular resource location has been added that is pertinent to the desired search terms since the previous visit to the location. Any added information is returned to the server for processing. An alert message can be generated and forwarded to an intended recipient to alert the recipient of the added information.

4 Claims, 4 Drawing Sheets

APPARATUS AND METHOD OF IMPLEMENTING FAST INTERNET REAL-TIME SEARCH TECHNOLOGY (FIRST)

This application is a divisional of application Ser. No. 09/726,537, filed Dec. 1, 2000; which is a divisional of application Ser. No. 09/409,256 filed Sep. 30, 1999 now U.S. Pat. No. 6,260,041, now allowed; the subject matter of which is incorporated by reference herein.

BACKGROUND OF THE INVENTION

No single academic, corporate, governmental, or non-profit entity administers the activities of people on the Internet. The very existence and operation of the Internet stems from the fact that hundreds of thousands of separate operators of computers and computer networks independently use common data transfer protocols to exchange communications and information with other computers (which in turn exchange communications and information with still other computers). There is no centralized storage location, control point, or communications channel for the Internet, and it would not be technically feasible for a single entity to control all of the information conveyed on the Internet.

The explosive growth in popularity of the Internet over recent years is in large part based on the unrestricted communication medium it provides. The Internet has created a very low cost forum in which people can freely publish information, views and opinions. Ironically, it is the Internet's ability to empower its users with the free flow of information exchange that makes its users the most vulnerable. The ease, for example, in which a company can generate "buzz" about its new product or service through strategic postings in Internet message boards, chat rooms, and discussion forums, can just as easily be used by stock-manipulative, rumor-mongering, short-sellers to distribute false or misleading information about the company and its offerings.

Although Internet search-engines and directory services such as AltaVista, Excite, Hotbot, Lycos, and Yahoo may be used to gather some of the information propagated around the Internet about a company and its products or services, these search entities generally maintain static databases that are updated infrequently relative to the dynamic information exchanges that transpire over the Internet on a daily basis.

SUMMARY OF THE INVENTION

Preferred embodiments of the invention solve the foregoing (and other) problems, and present significant advantages and benefits by providing an apparatus for and method of monitoring and retrieving identifiable statements and other information pertinent to one or more desired search terms or concepts. In a preferred embodiment, a fast Internet real-time search technology (FIRST) system provides a user interface for inputting and editing a list of desired search terms, and a list of resource locations to be monitored. A server causes the periodic access of each resource location listed to determine whether any information on a particular resource location has been added that is pertinent to the desired search terms since the previous visit to the location. Any added information is returned to the server for processing. An alert message can be generated and forwarded to an intended recipient to alert the recipient of the added information.

BRIEF DESCRIPTION OF THE DRAWINGS

Many advantages, features, and applications of the invention will be apparent from the following detailed description of the invention which is provided in connection with the accompanying drawings in which.

DETAILED DESCRIPTION OF PREFERRED EMBODIMENTS

Preferred embodiments and applications of the invention will now be described with reference to FIGS. 1–3. Other embodiments may be realized and structural or logical changes may be made to the disclosed embodiments without departing from the spirit or scope of the invention. Although the invention is particularly described as applied to the monitoring and retrieval from resource locations (e.g., Web pages, message boards, etc.) on the Internet of information pertinent to a list of desired search terms, it should be readily apparent that the invention may be embodied in any searching mechanism or other retrieval service having the same or similar problems.

Figure 1:
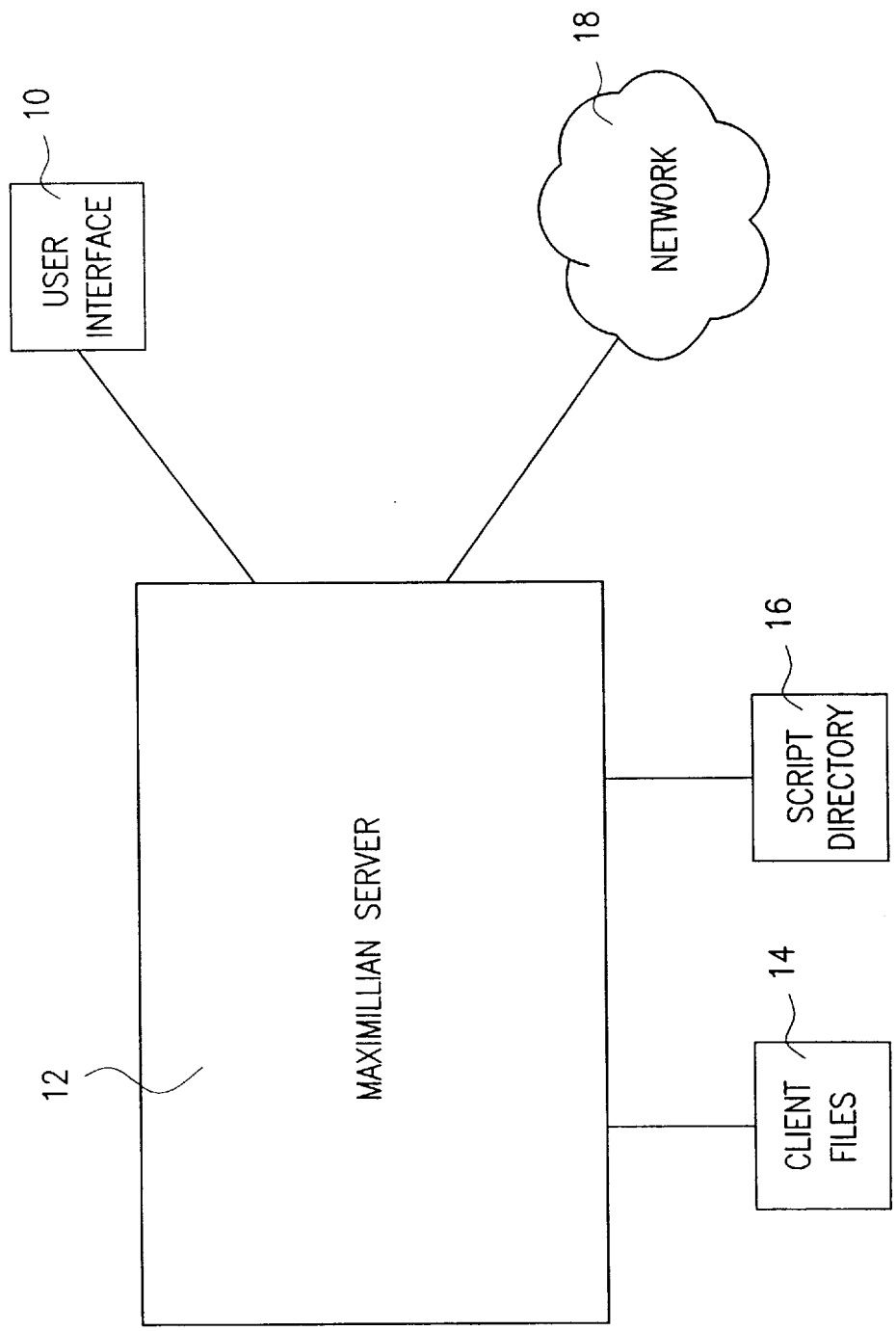
FIG. 1 is a block diagram illustrating a preferred embodiment of the invention that monitors resource locations on the Internet.

In a preferred embodiment, a monitoring and retrieval apparatus and (corresponding method) is embodied in a fast Internet real-time search technology (FIRST) system, as illustrated in FIG. 1. As shown in FIG. 1, the FIRST system is composed of a central processing structure 12 in the form of a server (referred to herein as "Maximillian server") used to monitor and retrieve information from a network 18 (such as the Internet in the illustrated embodiment). Maximillian server 12 receives inputs and delivers output to users through user interface 10. A series of files are accessed, generated, and updated by Maximillian server 12 during operation of the FIRST system, particularly files such as client file 14 and script directory 16, as will be described in more detail below.

Figure 2:
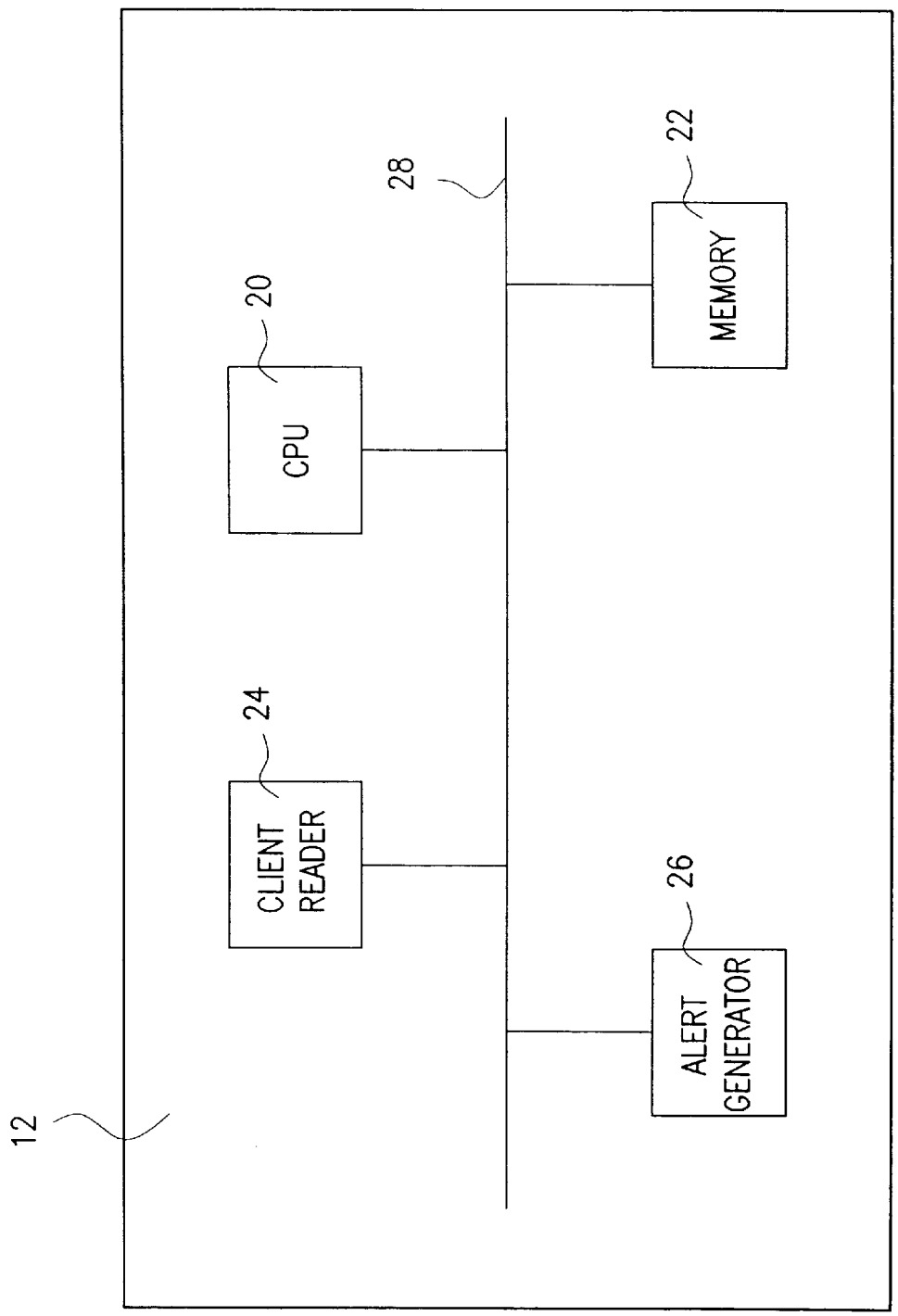
FIG. 2 is a block diagram of a preferred embodiment of the Maximillian server depicted in the system illustrated in FIG. 1.

As shown in FIG. 2, Maximillian server 12 is preferably embodied using one or more components coupled together using bus 28 (although alternative connection schemes known in the art may also be used). As illustrated in FIG. 2, a central processing unit (CPU) 20 is provided for execution of one or more computer programs stored in a recording medium such as memory 22. CPU 20 performs, controls, or at least informs the various processing steps performed by the FIRST system in monitoring and retrieving data from network 18. A client reader 24 is provided to access data stored in one or more client files 14.

In the preferred embodiment, "client files" contain a listing of one or more desired terms or concepts for which a user would like to have the FIRST system monitor network 18. For example, a user may wish to have the FIRST system monitor the Internet for any information related or pertinent to the commonly traded stock of Oracle Corporation. In the client file therefore the user could enter the company name "Oracle" or "Oracle Corporation" as its desired search terms, together with any additional search terms such as the stock symbol "ORCL". As will be described in detail below, Maximillian server 12, after accessing client file 14, would monitor network 18 (in the form of the Internet) for any information related or pertinent to the listed search terms "Oracle," "Oracle Corporation," or "ORCL." Any number of client files may be activated for monitoring by Maximillian server 12.

Client files 14 further include a listing of resources that are to be monitored by the FIRST system. In the preferred embodiment, the resources may be identified by uniform resource locator (URL) addresses of resource locations on the Internet. The URLs may represent Websites (static or dynamic), individual Web pages, message boards, locations of discussions groups, as well as any other communication resource, including e-mail messages. When an e-mail address is listed as a resource, the FIRST system monitors the content of e-mail messages (e.g., e-mail bulletins, list server messages, private mail, etc.) sent to the listed e-mail address. (In the preferred embodiment, the e-mail messages are routed simultaneously to both the intended recipient and the Maximillian server, although alternative e-mail routing schemes known in the art may be implemented.)

In the preferred embodiment, Maximillian server 12 accesses each of the resources listed in the client file 14 currently being processed. In accessing each resource, one or more "bots" are used by the FIRST system. The use of the term "bot" herein refers to the execution of an individual script (or computer program) by one or more processing devices, including CPU 20. In the preferred embodiment, a single bot is assigned to perform a single script in the script directory 16, although other embodiments could permit multiple scripts being executed by a single bot (or a single script being executed by multiple bots), as desired. Each bot is preferably programmed uniquely in accordance with the tasks required.

Script directory 16 contains various scripts executed by one or more processing devices during the operation of the FIRST system. The scripts are run automatically, preferably under control of Maximillian server 12, to perform discrete actions such as respond to different types of input, generate output, and to carry out various tasks as dictated by the specific script being implemented.

An alert generator 26 is provided to compose alert messages for transmission to one or more intended recipients. In the preferred embodiment, the client file 14 will include one or more intended recipients who are to receive an alert message once the FIRST system uncovers information relative to the desired search terms. In the preferred embodiment, alert generator 26 composes an e-mail message concerning the extent to which information related or pertinent to the desired search terms is found by the FIRST system. The e-mail message is sent by Maximillian server 12 to one or more intended recipients listed in the client file 14. Although the use of e-mail is made in the illustrated embodiment, it should be readily apparent that any means of communication (e.g., facsimile, voice mail, etc.), including real-time display on user interface 10 (or remote display over network 18) may be used to provide an alert message.

Figure 3:
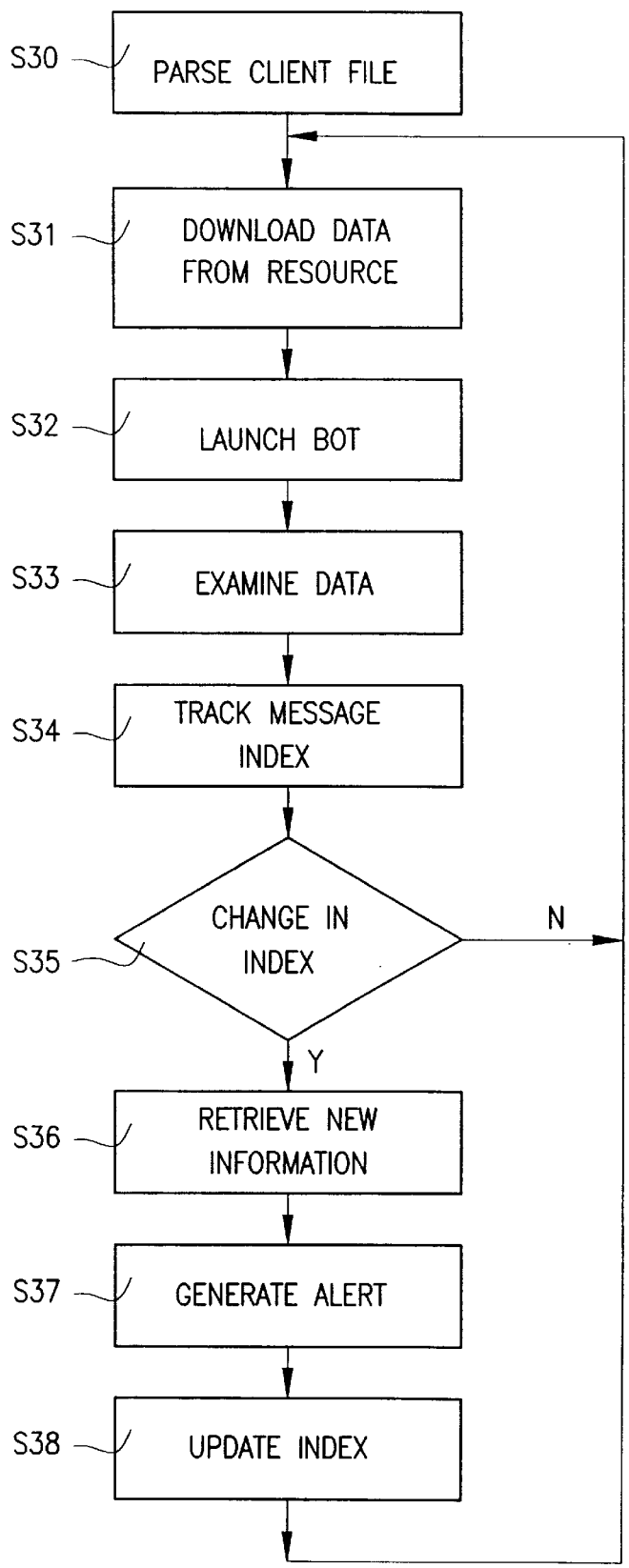
FIG. 3 is a flow chart illustrating the operational flow of a preferred embodiment of the invention.

In operation, the illustrated embodiment described above allows the FIRST system to monitor and retrieve information from one or more predetermined resources in accordance with the operational flow depicted in FIG. 3 in (steps S30 through S38). In the preferred embodiment, one or more client files 14 are read by client reader 24. For illustration purposes, it is assumed that only a single client file is operational at any one time. In this illustration, therefore, the data in the client file 14 is parsed in step S30 to identify the different search terms or concepts, the various resources to be monitored, the intended alert recipients, and any other identification data presented in client file 14.

Maximillian server 12 then operates to identify the different resources listed in client file 14. In the preferred embodiment, Maximillian server 12 sequentially accesses individual resources as listed in client file 14, although the embodiment may easily be modified to access the resources in any order, serially or in parallel. In this embodiment, the sequential accessing process is performed at or near the maximum processing speed permitted by the system so as to effect monitoring of the listed resources in real-time. For each resource location identified, Maximillian server 12 attempts to download data (e.g., hypertext mark-up language (HTML) data) from the listed location, step S31. The appropriate bot, as listed in script directory 16, is then launched in step S32 and the downloaded data examined in step S33. In the preferred embodiment, the launched bot examines the data directly, although in an alternative embodiment a separate processing device may be used.

The examination done in step S33 may employ one or more of a variety of well-known search/retrieval techniques. For example, a plain full-text search may be employed that looks for the exact word match of one or more desired search terms. As an alternative to (or in conjunction with) the full-text search, a conceptual or relevancy search may be employed that associates each of the desired search terms with different concepts or topics and attempts to match the different concepts/topics with those found in the resource location accessed. In addition, the examination may simply search for a specific type of information such as data representing messages on a given topic. Thus, as an illustration, where a specific Website or Web page is dedicated to presenting a discussion forum on a subject (e.g., ORCL stock), the examination simply looks for any information presented, regardless of the exact match of text with listed search terms. In an alternative embodiment, the searching function is performed by the hardware/software resident on the resource location (or on a remote location).

In one preferred embodiment, the information (e.g., text, pictorial, aural, video, etc.) found in step S33 to be related or otherwise pertinent to one or more of the desired search terms listed in client file 14 is culled out or returned from the resource location using any number of known techniques (e.g., using a "grep" command). The returned information is assumed to have (or be given) a unique identifier referred to herein as a "tracking index." The tracking index may differ from one resource location to another. For example, in some resources the information returned is a discussion group message having been assigned a unique message ID number, in other resources, the subject of the message itself serves as a unique identifier. The tracking index is thus determined in step S34.

By comparing in step S35 the unique identifier of the returned information with the identifier previously associated with the same resource location, the FIRST system can easily determine whether any changes in the information have been made (e.g., additional messages added, revised, etc.). Where there is no substantial difference in the tracking index for a given resource location, as determined in step S35, the data from another resource location can be downloaded by repeating process steps S32–S34, for example. If some change in the information on the resource location is detected, however, for example, through a change in the tracking index, the changed information is retrieved in step S36.

Alert generator 26 is then employed to compose in step S37 an alert message to inform an intended recipient of the information uncovered by the FIRST system. In the preferred embodiment, alert generator 26 composes an e-mail message for transmission to one or more of the intended recipients listed in client file 14. The composed message may provide a copy of the information (e.g., text, audio/ video file, graphic image, etc.) found to be new (or revised) concerning one or more of the desired search terms. Additional information such as the entity posting the new (or revised) information, the revision date, posting time, etc. that can be retrieved from the resource location may also be added to the alert message, as desired. Alert generator 26 may also utilize alternative delivery mechanisms such as real-time display of alert messages on user interface 10, direct real-time feed to users over network 18, etc.

In step S38 the tracking index for the resource location is then updated based on the changed (or revised) information detected. To the extent necessary, one or more additional tracking indexes may be employed for a single resource location to more particularly identify the variety of information (e.g., multiple messages, graphic and text messages, etc.) presented in the location. (The tracking index may be stored in client file 14, memory 22, one or more other storage devices (not shown), or may alternatively be derived when needed from other data stored.)

While preferred embodiments of the invention have been described and illustrated, it should be apparent that many modifications to the embodiments and implementations of the invention can be made without departing from the spirit or scope of the invention. For example, while only a real-time search technology has been specifically illustrated to monitor and retrieve information from resources located on the Internet, the invention may easily be deployed to monitor other communication networks (e.g., intranets, private bulletin boards, individual local or wide area networks, proprietary chat rooms, ICQ, IRC channels, instant messaging systems, ThirdVoice postings, etc.) using real-time or non-real-time systems in lieu of or in addition to the monitoring of the Internet resources. The client files 14 (as well as the resources listed therein) may be processed sequentially or in parallel by one or more processing devices. Additional modules may be added to interact with the FIRST system. For example, the alert messages generated may be forwarded to the user for manual or automatic annotation (e.g., categorizing alert information) and returned to a repository module for statistical analysis and archival storage. Thus, in one implementation, the user reviewing the information in the alert message may be presented with a series of input buttons in which to categorize the information (e.g., "irrelevant," "significant," "critical," etc.) and automatically reply or forward the information to the repository.

The modules described herein, particularly those illustrated in FIGS. 1 and 2, may be one or more hardware, software, or hybrid components residing in (or distributed among) one or more local or remote computer systems. Although the modules are shown as physically separated components, it should be readily apparent that the modules may be combined or further separated into a variety of different components, sharing different resources (including processing units, memory, clock devices, software routines, etc.) as required for the particular implementation of the embodiments disclosed herein. Indeed, even a single general purpose computer executing a computer program stored on a recording medium to produce the functionality and any other memory devices referred to herein may be utilized to implement the illustrated embodiments. User interface device 10 may be any device used to input and/or output information. The interface device 10 may be implemented as a graphical user interface (GUI) containing a display or the like, or may be a link to other user input/output devices known in the art.

In addition, memory unit 22 described herein may be any one or more of the known storage devices (e.g., Random Access Memory (RAM), Read Only Memory (ROM), hard disk drive (HDD), floppy drive, zip drive, compact disk-ROM, DVD, bubble memory, etc.), and may also be one or more memory devices embedded within CPU 20, or shared with one or more of the other components. The computer programs or algorithms described herein may easily be configured as one or more hardware modules, and the hardware modules shown may easily be configured as one or more software modules without departing from the invention. Accordingly, the invention is not limited by the foregoing description or drawings, but is only limited by the scope of the appended claims.

What is claimed as new and desired to be protected by Letters Patent of the United States is:

1. An article of manufacture comprising a machine-readable storage medium having stored therein indicia of a plurality of machine-executable control program steps, the control program comprising the steps of:

(a) inputting a list of monitored sites and identified terms, wherein data related to such terms may appear in the monitored sites;

(b) retrieving data from one of the monitored sites;

(c) examining the data to return any portion of the data related to the identified terms;

(d) using a tracking index to detect a real-time change in the data on the monitored site retrieved in step (b);

(e) retrieving the real-time change in the data on the monitored site based on the tracking index;

(f) generating an information alert to inform an intended recipient of the real-time change in data on the monitored site retrieved in step (b); and (g) repeating steps (b) through (f) for each monitored site listed in step (a).

2. The article of manufacture of claim 1, wherein the returning step (c) of the control program comprises the substep of retrieving messages from message boards dedicated to discussion of at least one term identified in said inputting step (a).

3. The article of manufacture of claim 1, wherein the tracking index of step (d) is a message identification number originating on a monitored site.

4. The article of manufacture of claim 3, wherein the change in the data retrieved in step (e) includes a subject of a message on a message board related to at least one term identified in said inputting step (a) and the identity of the entity posting the message.

\* \* \* \* \*

UNITED STATES PATENT AND TRADEMARK OFFICE
CERTIFICATE OF CORRECTION

PATENT NO. : 6,332,141 B2  
DATED : December 18, 2001  
INVENTOR(S) : Carlos M. Gonzalez et al.

Page 1 of 1

Figure 4:
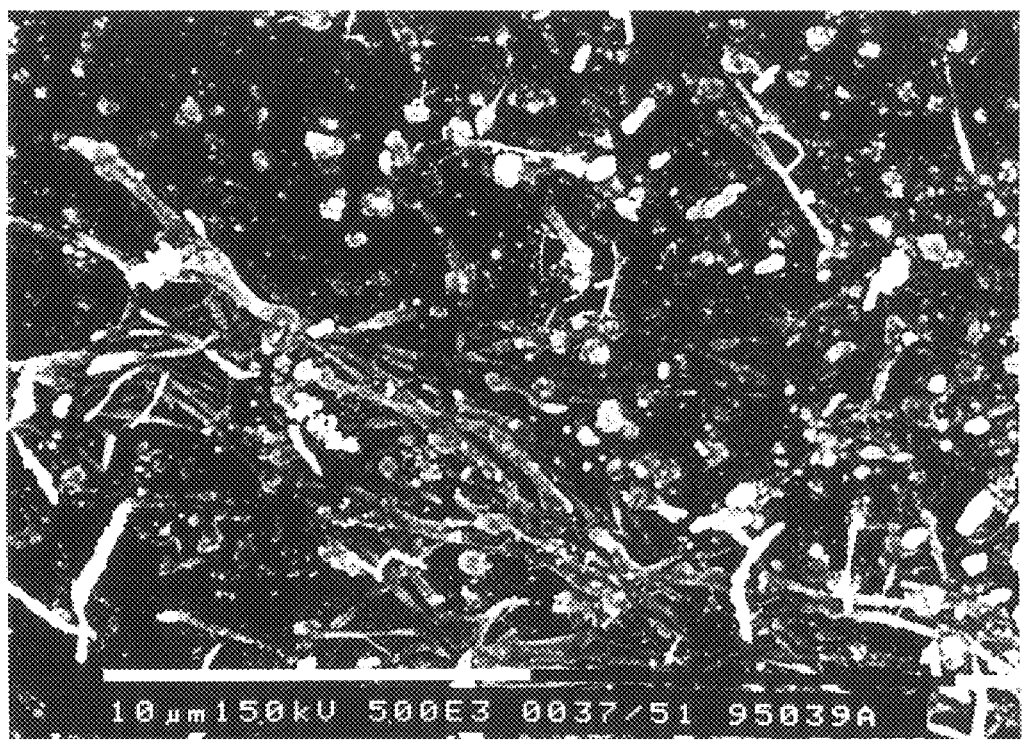

It is certified that error appears in the above-identified patent and that said Letters Patent is hereby corrected as shown below:

<u>Drawings</u>,
Please delete Figure 4.

Signed and Sealed this

Nineteenth Day of March, 2002

Attest:

Attesting Officer

JAMES E. ROGAN
*Director of the United States Patent and Trademark Office*